(12) United States Patent
Morris et al.

(10) Patent No.: US 7,014,016 B2
(45) Date of Patent: Mar. 21, 2006

(54) BRAKE PAD CLEARANCE SENSOR

(75) Inventors: Royston Leonard Morris, South Wales (GB); Mark Anthony Norman, South Wales (GB); Martin Pors Taylor, South Wales (GB); Lester Clarke, Burgess Hill (GB); Jeffrey Clive Thomas, Gwent (GB); Dennis A. Kramer, Troy, MI (US); Robert E. Costello, Shelby Township, MI (US); Jeffrey Allen Schoenhals, Lake Orion, MI (US); Paul C. Guenther, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 140 days.

(21) Appl. No.: 10/462,549

(22) Filed: Jun. 16, 2003

(65) Prior Publication Data

US 2004/0251090 A1    Dec. 16, 2004

(51) Int. Cl.
*F16D 66/00* (2006.01)
(52) U.S. Cl. .......................... 188/1.11 W; 188/1.11 E; 340/453; 340/454

(58) Field of Classification Search ........... 188/1.11 L, 188/1.11 W, 1.11 R, 1.11 E, 348, 196 R, 188/71.7; 340/453, 454; 116/208; 92/5 R; 303/113.4; 192/30 W
See application file for complete search history.

(56) References Cited

U.S. PATENT DOCUMENTS

| | | | | |
|---|---|---|---|---|
| 4,989,537 | A | * | 2/1991 | Hutchinson et al. ........ 116/208 |
| 5,358,075 | A | * | 10/1994 | Jarzombek ............... 188/1.11 L |
| 5,450,930 | A | * | 9/1995 | Martens et al. .......... 188/1.11 L |
| 5,934,415 | A | * | 8/1999 | Preston et al. .......... 188/1.11 L |
| 6,345,699 | B1 | * | 2/2002 | Runels ................... 188/1.11 L |
| 6,352,137 | B1 | * | 3/2002 | Stegall et al. ........... 188/1.11 L |
| 6,411,206 | B1 | * | 6/2002 | Weant et al. ............... 340/479 |
| 6,753,771 | B1 | * | 6/2004 | Lesesky ..................... 340/479 |

* cited by examiner

*Primary Examiner*—Thomas Williams
*Assistant Examiner*—Mariano Sy
(74) *Attorney, Agent, or Firm*—Carlson, Gaskey & Olds

(57) ABSTRACT

A brake actuator assembly includes a sensor mounted to a push rod which is in communication with a transceiver antenna. The sensor provides positional information of the push rod relative to the antenna. A clearance between a friction element and a rotating brake member is determined based on displacement of the push rod and known mechanical relationships within the brake actuator.

11 Claims, 3 Drawing Sheets

BRAKE PAD CLEARANCE SENSOR

BACKGROUND OF THE INVENTION

This invention generally relates to a brake actuator assembly, and specifically to a brake actuator assembly including a sensor for monitoring clearance between a friction element and a rotating member.

Conventional brake assemblies include an actuator for moving a friction element into contact with a rotating member. Typically, an actuator drives the friction element from a home position into contact with the rotating member. Wear of the friction element increases the distance that the friction element must move to contact the rotating member. The increased distance is typically accommodated by mechanical devices that compensate for friction element wear by adjusting a home position closer to the rotating member.

A known brake actuator includes a push rod movable in response to changes in air pressure within an air chamber. The push rod includes a hollow inner cavity for a biasing spring. Movement of the push rod is transmitted through the biasing spring to an insert. Movement of the insert causes movement of an operating shaft. The operating shaft in turn moves mechanical linkage that drives brake pads toward engagement with a rotor.

Once the brake pad contacts the rotor, the push rod overcomes the biasing spring and contacts the insert forming a solid linkage. As the brake pad wears, displacement of the push rod must also increase to compensate. The displacement of the push rod corresponds to movement of the brake pad. Therefore, clearance between the brake pad and the rotor corresponds to the displacement of the push rod.

Current brake actuators measure displacement of the push rod with a mechanical switch indicating clearance between the brake pad and the rotor. A controller adjusts the initial home position between the rotor in view of the measured clearance between the brake pad and the rotor in order to maintain consistent braking force throughout the useful life of the brake pad.

Disadvantageously, mechanical switches provide only limited accuracy and dependability. Further, mechanical switches require specific actuation features on brake member components, and are difficult to adapt to different actuator assemblies.

Accordingly, it is desirable to design an accurate, adaptable method and device for determining clearance between a friction element and a rotating member.

SUMMARY OF INVENTION

The present invention provides a method and device for determining clearance between a friction element and a rotating member utilizing passive sensors that communicate through a wireless link.

The brake actuator assembly of this invention includes a push rod movable within an air chamber. A sensor mounted to the push rod communicates through a transceiver antenna. Signals from the sensor are detected by the antenna and used to determine displacement of the push rod. Displacement of the push rod corresponds to known displacement of elements within the brake actuator, and to the clearance between the friction element and the rotating member.

Accordingly, the present invention provides an accurate and adaptable method and device for determining clearance between a friction element and a rotating member of a brake assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
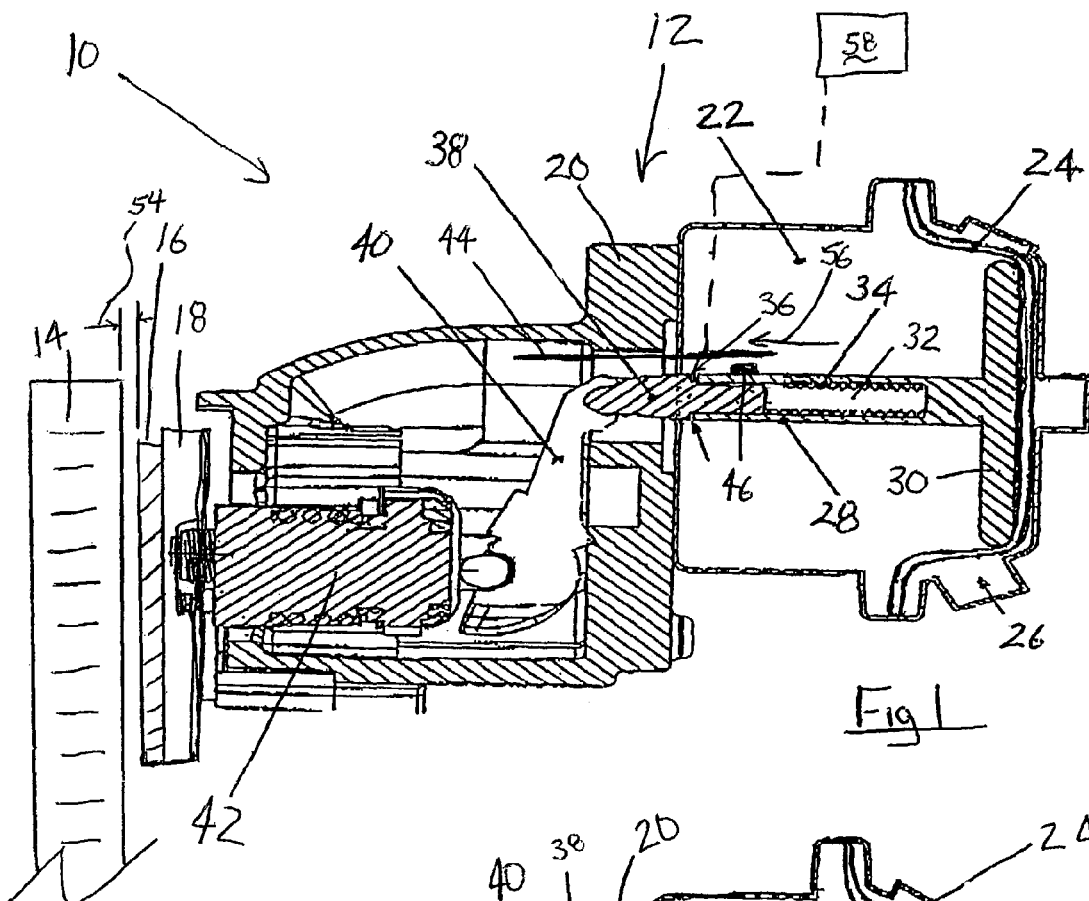
FIG. 1 is a schematic view of a brake actuator assembly.

Referring to FIG. 1, a brake assembly 10 includes an actuator 12 for moving a brake pad 18 into frictional engagement with a rotor 14. Friction material 16 mounted to the brake pad 18 selectively contacts the rotor 14. Clearance 54 between the friction material 16 and the rotor 14 changes during use due to normal wear.

A transceiver antenna 44 sends signals of a predetermined frequency to a sensor 46. Preferably, the sensor 46 is an inductive resonance device, such as a transponder that transmits a signal in response to a signal received. Transmissions from such transponders are powered by the received signal. However, other passive or active sensors known to a worker skilled in the art are within the contemplation of this invention. Inductive resonance devices require no external electrical connection or power source and therefore are adaptable to brake actuators of many different configurations.

The sensor 46 is disposed on a push rod 28. In response to signals transmitted from the antenna 44, the sensor 46 transmits a signal indicating the instant position of the push rod 28. Subsequent signals from the sensor 46 are used to determine displacement of the push rod 28. The antenna 44 includes an electrical connection to a controller 58. Free push rod 28 displacement, combined with known mechanical relationships between movement of the push rod 28 and the brake pad 18 is used to determine the clearance 54 between the rotor 14 and the friction material 16.

A worker skilled in the art with the benefit of this disclosure would understand how to program a commercially available controller to accomplish the desired determinations in combination with the teachings of the present invention. Further, the controller 58 may be a portion of a larger vehicle controller or a device dedicated only to brake actuator operation.

The illustrated brake actuator 12 is pneumatically operated to force the brake pad 18 into contact with the rotor 14. The actuator 12 advances the brake pad 18 toward the rotor 14 in response to an increase in air pressure within an air chamber 22. Air pressure within the air chamber 22 is controlled by communicating air through inlets 26. Air pressure entering the inlets 26 forces a diaphragm 24 into a head portion 30 of the push rod 28. Air pressure on an inlet side of the diaphragm 24 forces the push rod 28 to move in the direction indicated by arrow 56.

The push rod 28 includes a cavity 32 containing a biasing member 34. The biasing member 34 is disposed within the cavity 32 of the push rod 28 and transmits movement of the push rod 28 to an insert 38. The insert 38 moves against an operating arm 40. The operating arm 40 moves an actuator arm 42 that results in movement of the brake pad 18 toward and into contact with the rotor 14.

Once the friction material 16 contacts the rotor 14, the biasing member 34 compresses until the push rod 28 contacts a shoulder 36 of the insert 38 to form a solid linkage. In the solid linkage condition, the insert 38 and the push rod 28 move as a common member in the direction indicated by arrow 56. The mechanical relationship between free displacement of the push rod 28, the insert 38 and the operating aim corresponds to the amount of clearance 54 between the friction material 16 and the rotor 14.

The sensor 46 mounted to the push rod 28 is in communication with the antenna 44. The antenna 44 is powered to transmit a predetermined resonant frequency. Each sensor 46 transmits a return signal indicative of a current sensor position. Successive position signals for each sensor 46 are used to determine displacement of the push rod 28. The position of the push rod 28 is then combined with the known mechanical relationship between the insert 38, operating shaft 40, actuator arm 42 and brake pad 18 to determine the amount of clearance 54 between the friction material 16 and the rotor 14.

Figure 2:
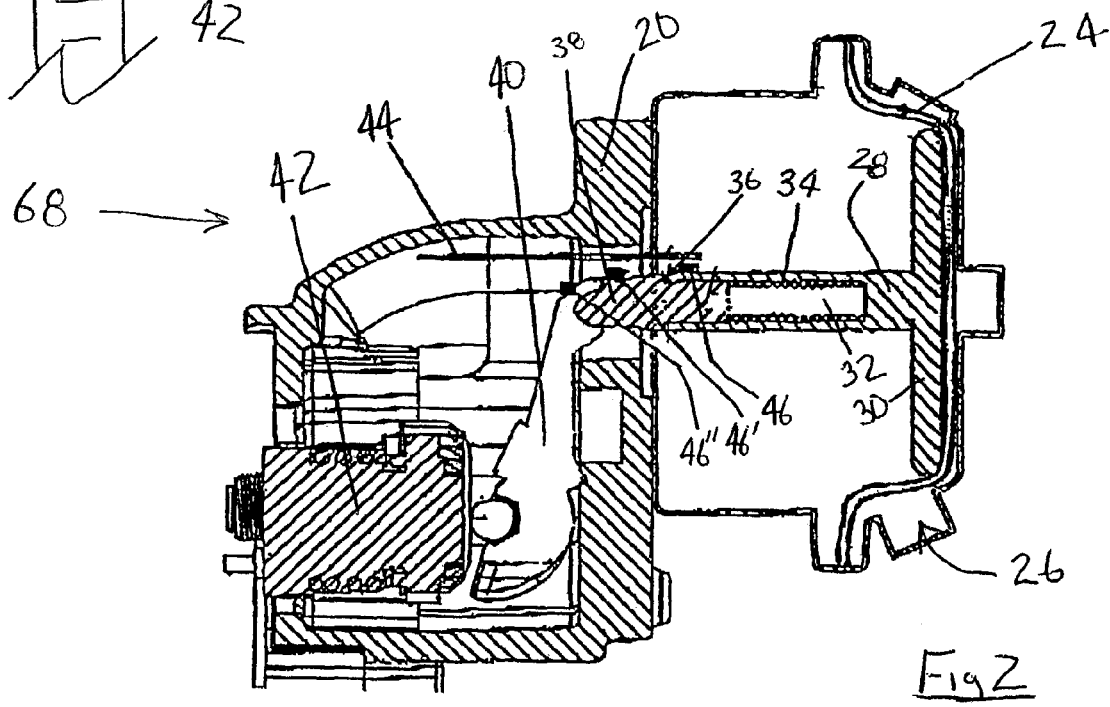
FIG. 2 is a schematic view of another embodiment of a brake actuator.

Referring to FIG. 2, another brake actuator 68 includes the sensor 46 mounted to the insert 38 and a second sensor 46' mounted to the push rod 28. Further, a third sensor 46" is mourned to the operating arm 40. The antenna 44 is mounted within the brake actuator 68 proximate the sensors 46, 46', 46" to receive signals therefrom. The antenna 44 receives signals from the sensors 46, 46', 46" to determined relative displacement and track movement of each individual sensor 46, 46' and 46". Relative movement and displacement between each of the three sensors 46, 46', 46" is used to determine the instant relationship between the insert 38, push rod 28, actuator arm 42 and operating arm 40. The known mechanical relationship between the push rod 28, insert 38 and operating arm 40 along with the relative displacements between each part are then used to determined the position of the brake pad 18 and friction material 16 relative to the rotor 14.

Figure 3:
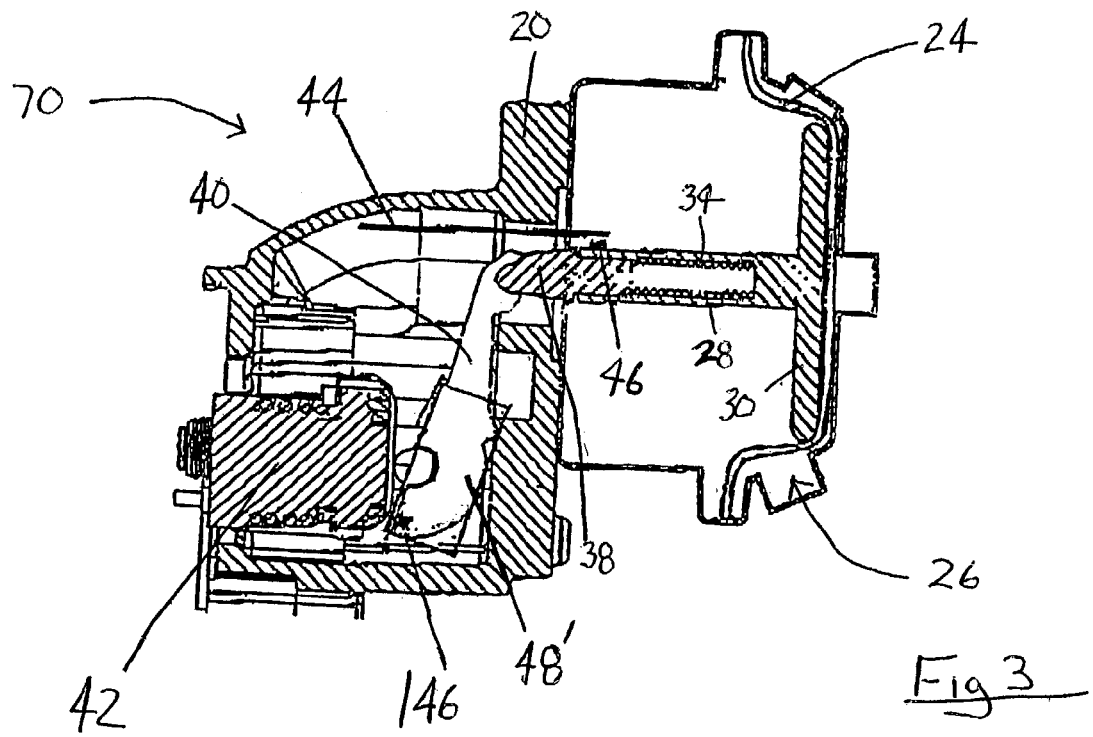
FIG. 3 is a schematic view of another embodiment of a brake actuator.

Referring to FIG. 3, another brake actuator 70 includes a second antenna 48' positioned within the brake actuator 12 to monitor position of a sensor 146 mounted to the operating arm 40. The antenna 44 and sensor 46 attached to the push rod 28 transmits signals used to determine a position of the push rod 28. Position of the push rod 28 relative to the position of the operating arm 40 are compared and combined with knowledge of the mechanical relationship with the brake pad 18 to determined and control clearance 54. Each of the sensors 46, 146 transmits signals of different frequencies to identify whether the transmission indicates push road 28 position or operating arm 40 position.

Figure 4:
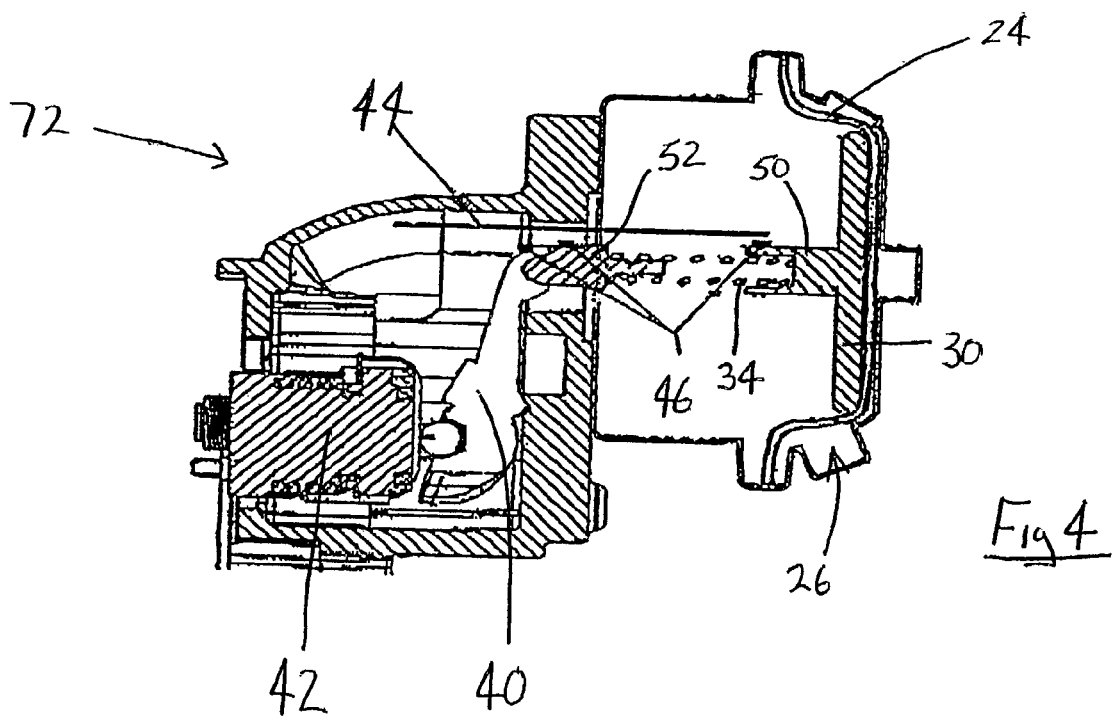
FIG. 4 is a schematic view of yet another embodiment of a brake actuator.
Figure 5:
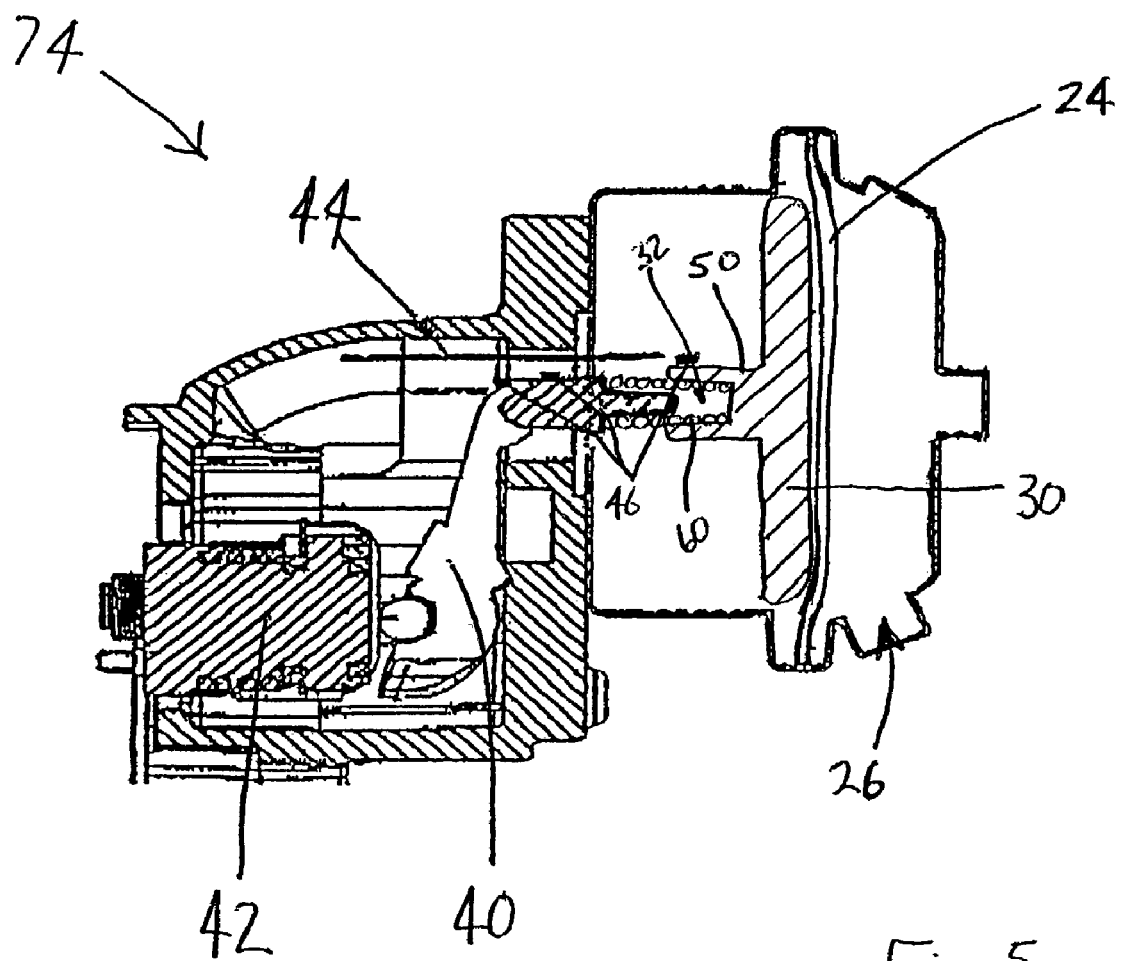
FIG. 5 is a schematic view of the brake actuator shown in FIG. 4.

Referring to FIGS. 4 and 5, another brake actuator 72 includes the insert 52 and push rod 50 which are not in contact and do not form a solid link. The biasing member 34 compresses to a solid condition to form a solid link between the insert 52 and push rod 50. The biasing member 34 is a spring with a fixed rate. The biasing member 34 may also be a multi-rate spring to provide varying biasing forces based on application specific requirements. The push rod 50 is shorter than in previous described embodiments, such that the biasing member 34 compresses to a fully collapsed condition (FIG. 5) before the push rod 50 contacts the insert 52. The biasing member 34 compresses to the fully collapsed condition when the friction material member 16 contacts the rotor 14. Both the insert 52 and the push rod 50 include a sensor 46. The operating arm 40 also includes a sensor 46

The antenna 44 receives signals from each sensor 46 to indicate a current position of the insert 52, the operating arm 40 and the push rod 50. Free travel between the insert 52 and push rod 50 is increased such that the push rod 50 will not form a solid linkage. Information on displacement between the insert 52 and push rod 50, combined with known characteristics of the biasing member 34 is used to determine the force applied to the operating arm 40. Displacement of the insert 52 relative to the push rod 50 combined with a known rate of the biasing member 34 is used to determine forces exerted on the operating arm 40.

The position of the insert 52 relative to the push rod 50 changes in response to changes in air pressure once the brake pad 18 contacts the rotor 14. The change in position of the insert 52 relative to the push rod 50 is proportional to the rate of the biasing member 34 and therefore the force exerted against the rotor 14 can be determined. Further, known dimensions of the air chamber 22, combined with the displacement of the biasing member 34 are used to determine air pressure within the air chamber 22.

Displacement information combined with known mechanical relationships within the brake actuator 72 may be utilized to determine any number of operational parameters in addition to the clearance 54 between the friction material 16 and the rotor 14, for example, air pressure within the air chamber 22 and force exerted on the rotor 14. Determinations of other operational parameters are within the contemplation of this invention.

A brake actuator designed with the advantage of this disclosure provides an accurate and reliable means of determined pad and rotor clearance along with a means of monitoring brake actuator performance during operation. The clearance information is used to suggest when the brake pad 18 is in need of replacement or for other known purposes.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A brake actuator assembly comprising:
a friction member movable to engage a rotatable member;
a first sensor movable in response to movement of said friction member, wherein said brake actuator assembly includes a push rod to drive said friction member toward the rotatable member, said first sensor disposed on said push rod;
an antenna to receive a signal from said first sensor for determining a clearance between said friction member and the rotable member; and
an insert cooperating with said push rod to drive said friction member toward the rotatable member and a second sensor disposed on said insert for determining displacement of said insert.

2. The assembly of claim 1, further comprising a biasing member disposed between said insert and said push rod, movement of said push rod is transferred through said biasing member to said insert.

3. The assembly of claim 2, wherein said biasing member comprises a fixed rate spring.

4. The assembly of claim 2, wherein said biasing member comprises a multi-rate spring.

5. The assembly of claim 2, wherein said push rod contacts said insert to form a solid link at a predetermined displacement.

6. The assembly of claim 2, wherein said push rod contacts said insert to form a solid link at a predetermined force.

7. The assembly of claim 1, further comprising an operating shaft movable in response to movement of said push rod and a third sensor disposed on said operating shaft.

8. A method of determining clearance between a friction member and a rotatable member, said friction member movable relative to the rotatable member by a brake actuator, said method comprising the steps of:
   a) communicating between an antenna and a sensor, a first signal indicative of a position of a first movable member;
   b) transmitting a second signal from a second sensor indicative of a position of a second movable member;
   c) determining a relative displacement between said first and second members based on said first and second signals; and
   d) determining a clearance between said friction member and the rotatable member in response to said position of said first movable member and a relationship between said first movable member and said friction member.

9. A method of determining clearance between a friction member and a rotatable member, said friction member movable relative to the rotatable member by a brake actuator, said method comprising the steps of:
   a.) communicating between an antenna and a sensor a first signal indicative of a position of a first movable member;
   b.) transmitting a second signal from a second sensor indicative of a position of a second movable member;
   c.) determining a clearance between said friction member and the rotatable member in response to said position of said first movable member and a relationship between said first movable member and said friction member; and
   d.) determining a force exerted on said first movable member based on a predetermined rate of a biasing member and a relative displacement between said first and second movable members.

10. A method of determining clearance between a friction member and a rotatable member, said friction member movable relative to the rotatable member by a brake actuator, said method comprising the steps of:
   a) communicating between an antenna and a sensor a first signal indicative of a position of a first movable member;
   b) transmitting a second signal from a second sensor indicative of a position of a second movable member;
   c) transmitting a third signal indicative of a position of a third movable member; and
   d) determining a clearance between said friction member and the rotatable member in response to said position of said first movable member and a relationship between said first movable member and said friction member.

11. The method of claim 10, wherein step d) further comprises determining a relative displacement between said first, second and third movable members, and determining said clearance based on a mechanical relationship between said first, second and third members, and said friction member.

* * * * *